UNITED STATES PATENT OFFICE 2,283,832

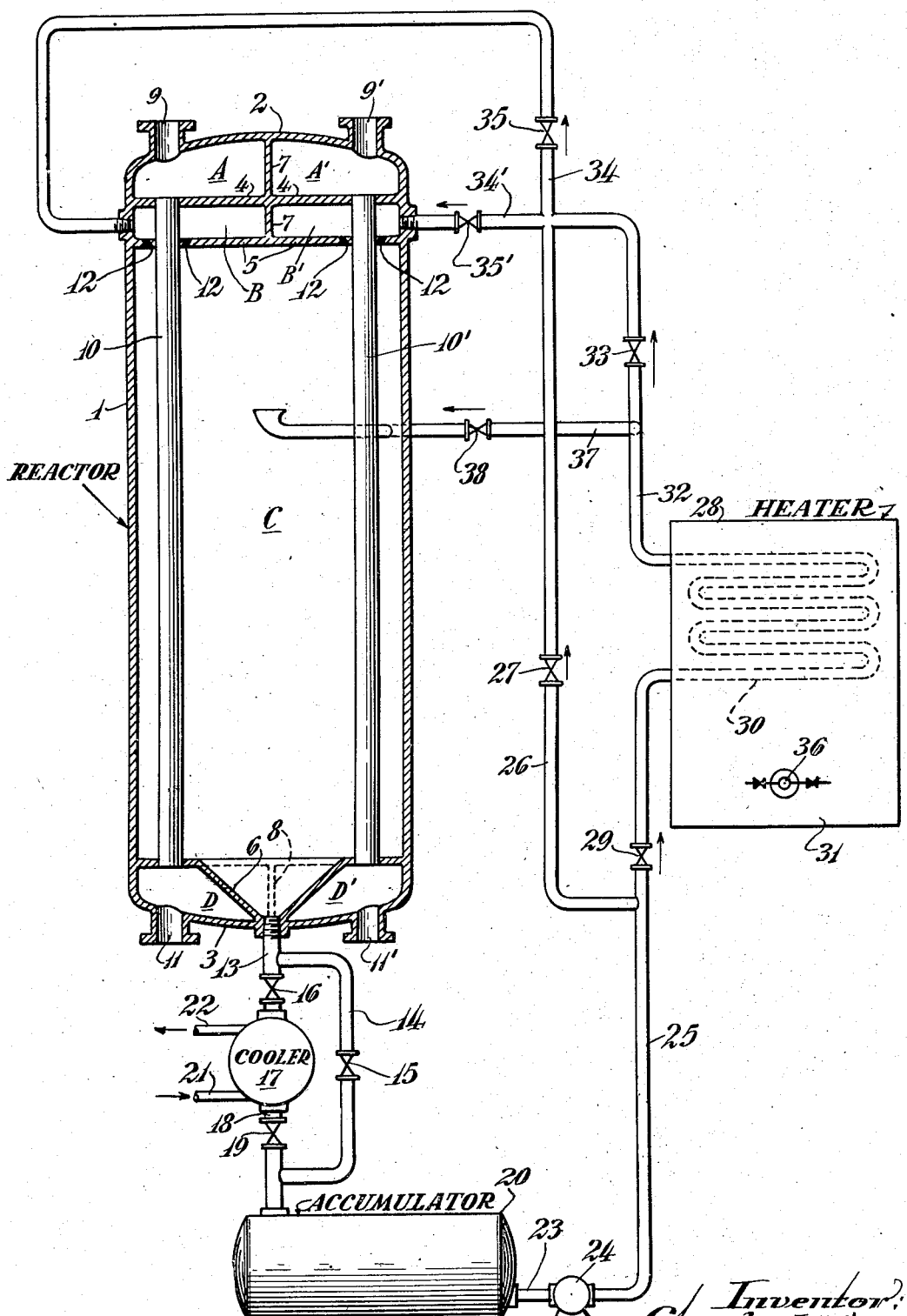

CONTROL OF ENDOTHERMIC AND EXOTHERMIC CATALYTIC REACTIONS

Charles L. Thomas, Chicago, Ill., assignor to Universal Oil Products Company, Chicago, Ill., a corporation of Delaware Application February 9, 1940, Serial No. 318,098

9 Claims. (Cl. 23—1)

The invention particularly relates to an improved method and means of controlling the temperature of simultaneously conducted endothermic and exothermic reactions, whereby heat liberated in the exothermic step is advantageously supplied to the endothermic step through the medium of liquid which is vaporized by indirect heat exchange with the materials in the exothermic relation zone and condensed by indirect heat exchange with the materials in the endothermic reaction zone.

The usual method of controlling temperatures in simultaneously conducted endothermic and exothermic reactions, wherein a vaporizing and condensing fluid is employed as the heat transfer medium, is to employ separate interconnected reactors of the heat exchanger type each containing tubular elements or the like wherein the desired conversion reaction takes place, the tubular elements wherein the exothermic reaction is taking place being disposed in a body of liquid which is vaporized by the heat evolved, the vapors thus generated being conducted to the other reactor wherein they are condensed by contact with the tubular elements wherein the endothermic reaction is taking place and the condensed liquid being returned therefrom to the body of liquid in the first reactor.

The present invention obviates the use of separate reactors in this type of system by disposing the tubes or other elements wherein the endothermic and exothermic reactions occur within a common shell or housing comprising a single reactor and spraying or washing the surface of the zone in which the exothermic reaction is taking place with the heat transfer liquid which is thereby vaporized and condenses on the surface of the zone in which the endothermic reaction is taking place. This also obviates maintaining a substantial body or a pool of liquid about the zone wherein the exothermic reaction occurs and is particularly advantageous in operations wherein the zones of endothermic and exothermic reactions are periodically shifted from one set of tubes to another, since the shift may be accomplished without transferring a substantial body or pool of liquid from one reactor to another.

Another advantage results from the fact that, with the improved apparatus and mode of operation herein provided, the quantity of heat transfer fluid required for an installation of any given capacity is materially reduced by virtue of the substitution of a sheet or film of evaporating liquid on the surface of the tubes or other elements wherein the exothermic reaction takes place for a substantial body or pool of liquid in which, according to conventional practice, said tubes or other elements are immersed or bathed.

Preferably, in accordance with the provisions of the present invention, any of the liquid heat transfer medium which remains unvaporized in flowing over the surface of the catalyst container in which the exothermic reaction is taking place, as well as the condensate which forms on the surface of the catalyst container in which the endothermic reaction is taking place, flows from the lower portion of the reactor to a small accumulating drum or the like wherefrom it is pumped back to the reactor and sprayed or otherwise distributed over the surface of the catalyst container in which the exothermic reaction is taking place. Thus, when the operation is discontinued for any reason and the circulating pump is stopped, the liquid drains to the accumulator, leaving the reactor substantially dry. This is particularly advantageous when a heat transfer fluid which solidifies at normal temperature is employed, since, by the elimination of a body of such material in the reactor, its solidification therein and the attendant difficulties are obviated. Thus, the reactor may be readily opened for inspection, repair or the like, after the operation is discontinued and the apparatus is cooled, and in order to melt the heat transfer material in preparation for starting the operation, it is only necessary to supply heat externally, or otherwise, to the relatively small mass of such material in the accumulator.

The invention is adapted to be advantageously utilized for controlling temperatures in a wide variety of catalytically promoted or catalytically retarded reactions and although, as previously explained, it is particularly advantageous as applied to simultaneously conducted endothermic and exothermic reactions of the class in which the zones of endothermic and exothermic reaction are periodically shifted, it is not limited to catalytic reactions so long as the operation involves the transfer of heat from a zone wherein it is liberated to one in which it is absorbed through the medium of a vaporizing and condensing fluid employed in the manner herein provided.

The most common example of an operation of the general type in which the zones of endothermic and exothermic reaction are periodically shifted, is one in which the activity of a mass of catalytic material employed to promote or retard one of the reactions decreases with such rapidity and to such an extent that frequent periodic revivification or reactivation of the catalyst is required. This occurs in such endothermic processes as the catalytic cracking and catalytic dehydrogenation of hydrocarbons, wherein heavy carbonaceous conversion products deposit on and foul the surface of the catalyst particles, reactivation of the catalyst being an exothermic reaction and involving burning of the carbonaceous materials from the catalyst in a stream of hot oxidizing gas. The catalytic polymerization of hydrocarbons and catalytic hydrogenation are examples of other exothermic reactions which may comprise the exothermic step of a process embodying the features provided by the invention and in such instances the endothermic step may comprise, for example, preheating of the reactants for the exothermic step, the generation of steam, the heating or vaporization of oil or any other fluid for any desired purpose or it may comprise a pyrolytic or catalytic conversion reaction such as thermal or catalytic cracking, dehydrogenation, isomerization, cyclization or the like or a combination of such operations. These examples are typical of conversion operations encountered in modern hydrocarbon oil refining. The invention will find further application in many other chemical industries and its broad features are in no way limited to the specific reactions involved.

Any heat transfer medium may be employed which will substantially vaporize at a temperature within the range of that desired for the exothermic reaction and which will be substantially condensed at a temperature within the range suitable for conducting the endothermic reaction. Atmospheric or substantially atmospheric pressure may be employed in the zone wherein vaporization and condensation of the heat transfer medium employed occurs, or, when required, the boiling point of the heat transfer medium employed may be modified by the use of sub-atmospheric or superatmospheric pressure in this zone. The specific heat transfer medium employed in any given case may be selected to fulfill the above requirements and may range from relatively low-boiling liquids or readily condensible normally gaseous materials such as propane, water, alcohol and the like through the many heavier liquids such as hydrocarbon oils, aliphatic and aromatic ethers and glycols to and including normally solid materials such as molten salts and mixtures thereof (eutectic or otherwise) low melting point metals and alloys. Wherever possible, the heat transfer medium selected should be non-corrosive and otherwise chemically inert to metals which are not injured by and exert no detrimental effect on the endothermic and exothermic reactions involved but, when no heat transfer medium which fulfills all of these requirements is available, the shell and tubular elements or catalyst containers of the reactors may be constructed of a metal or an alloy which is not adversely effected by a heat transfer medium which possesses the required physical characteristics, while the tubes or other elements of the reactor, which form the zones wherein the endothermic and exothermic reactions occur, may be coated or lined with another suitable metal, alloy or other protective coating which does not adversely affect and is not adversely affected by the reactants and the catalyst, in case a catalyst is employed.

The accompanying drawing diagrammatically illustrates one specific form of apparatus embodying the features provided by the invention and in which the improved process of the invention may be conducted. The shell of the reactor is illustrated in cross-section and other portions of the apparatus are shown in elevation.

Referring to the drawing, the outer shell 1 of the reactor, in the particular case here illustrated, is cylindrical in form and is provided with an upper head 2 and a lower head 3. The interior of the shell is divided into compartments, A and A', B and B', C, D and D' by means of the horizontal partitions 4 and 5, the lower substantially cone-shaped partition 6 and the vertical partitions 7 and 8. An inlet nozzle 9 in the upper head 2 communicates with compartment A and compartments A and D communicate through the tubular elements 10 extending therebetween, an outlet nozzle 11 in the lower head 3 communicating with compartment D. On the opposite side of a vertical plane passing through partitions 7 and 8, an inlet nozzle 9' in the upper head communicates with compartment A' and the latter communicates with compartment D' through the tubular elements 10' extending therebetween, an outlet nozzle 11' communicating with compartment D' being provided in the lower head 3.

Compartments B and B' each communicate with compartment C through a plurality of suitable orifices or spray nozzles, such as indicated, for example, at 12, which are provided in partition 5 about each of the tubular elements 10 and 10'. The purpose of these openings 12 is to spray liquid from zone B over the surface of tubes 10 or the liquid from zone B' over the surface of tubes 10', whichever tubes comprise the zone in which the exothermic reaction is taking place, as will be later explained.

Vapors generated on the surface of the zone in which the exothermic reaction is taking place are totally or partially condensed on the surface of the zone in which the endothermic reaction is taking place. Thus, an efficient transfer of heat from the exothermic to the endothermic reaction is obtained.

Condensate formed on the surface of the zone in which the endothermic reaction is taking place is removed from the lower portion of the reactor through line 13, together with any quantity of vapors generally in excess of those required to supply the desired heat to the endothermic reaction. When only liquid condensate is thus removed from the lower portion of the reactor, it may be supplied from line 13 through line 14, valve 15 and line 19 to accumulator 20 or it may be passed, all or in part, from line 13 through valve 16, cooler 17, line 18 and valve 19 to the accumulator. In case vapors are withdrawn with the liquid from the reactor, the mixture is preferably passed, as above described, through cooler 17 to the accumulator.

The function of cooler 17 is to condense any vaporous components of the convective medium removed from the reactor and to reduce the temperature of the convective medium, when this is required. It may be of any suitable conventional form and, in the particular case here illustrated, comprises a heat exchanger to which suitable cooling fluid is directed through line 21, passes through the cooler in indirect heat exchange relation with the convective medium and is removed therefrom through line 22. Thus, only liquid is collected in the accumulator and is preferably kept at such a temperature that it may be returned therefrom to the reactor and sprayed over the surface of the tubular elements in which the exothermic reaction is taking place at a temperature close to its vaporization point, allowing for radiation losses from the circulating equipment. This temperature adjustment may be accomplished by the operation of cooler 17 and valve 15 in by-pass line 14 or by adjustment of the amount and/or temperature of cooling fluid passed through cooler 17.

Liquid from accumulator 20 is directed through line 23 to pump 24 wherefrom it is fed through line 25 and it may ordinarily be directed therefrom, all or in part, through line 26 and valve 27 back to zone B or to zone B' without additional heating or cooling. However, in case additional heating of the recirculated convective liquid is required to obtain a closer approach to its vaporization point in zones B and B', without allowing any appreciable quantity of vapors to collect in the accumulator, all or a regulated portion of the convective liquid is recirculated to zones B and B' through heater 28 by manipulating valve 27 in line 26, valve 29 in line 25 and valve 33 in line 32. From the junction of lines 32 and 26, the reheated or unreheated liquid from accumulator 20 is directed through line 34 and valve 35 to zone B or through line 34' and 35' to zone B' and from zone B or zone B', as the case may be, it is again caused to pass over the surface of the tubular elements in which the exothermic reaction is taking place.

Heater 28 may be of any suitable conventional form and, in the particular case here illustrated, comprises a heating coil 30 disposed in a suitable furnace 31 to which a regulated quantity of fuel and air are supplied through burner 36 to generate hot combustion gases in the furnace and supply the desired quantity of heat therefrom to the convective fluid passing through coil 30.

Instead of serving as a tempering zone wherein any required small additional quantity of heat may be supplied to the convective liquid recirculated from the accumulator to zones B and B', heater 28 may, in accordance with another mode of operation of the process, serve as a zone wherein a regulated quantity of the recycled convective liquid may be revaporized at substantially the temperature prevailing in space C of the reactor and supplied to the latter zone to augment, to any desired degree, the quantity of vapors evolved from the convective liquid on the surface of the zone in which the exothermic reaction is taking place. When this mode of operation is employed, regulated quantities of the liquid from accumulator 20 are directed through valve 29 in line 25 to and through heating coil 30 wherein they are vaporized and from which they are thence directed through line 32, line 37 and valve 38 into space C of the reactor wherein they commingle with the vapors evolved from the convective fluid in this zone and, by condensation on the surface of the tubes in which the endothermic reaction is taking place, supply to the latter any heat required for conducting the endothermic reaction in excess of that evolved in the exothermic reaction.

In case heater 28 is utilized in the manner last described and it is also necessary to supply some additional heat to the convective liquid recirculated from the accumulator to zones B and B', a separate heater of any conventional form suitable for supplying the required additional heat to the convective liquid recirculated to the zones B and B' is preferably provided in line 26, although this is not illustrated in the drawing.

The tubes 10 and the tubes 10' comprise separate zones in which contact material such as a catalyst for promoting the desired reaction may be disposed and in which the desired endothermic reaction and exothermic revivification of the catalyst may be alternately conducted. Any suitable means of conventional form may be employed for switching the flow of the stream of reactants and reactivating gases with respect to zones A and A' and the separate tube banks and for diverting the outgoing reaction products and partially spent revivifying gases from zones D and D', each to the desired subsequent equipment. The specific form of such means employed do not constitute part of the invention and since several suitable forms are now well known in the industry they are not illustrated in the drawing.

It will be apparent from the above that the invention takes advantage of the latent heat of vaporization and the latent heat of condensation of a circulating heat transfer fluid for controlling the temperature of simultaneously conducted endothermic and exothermic reactions and that, with the apparatus provided, this may be accomplished with a relatively small quantity of heat transfer fluid and without maintaining a substantial body or pool of vaporizing heat transfer liquid about the zone in which the exothermic reaction is taking place, thereby accomplishing the improvements mentioned prior to the description of the drawing. Furthermore, the process adapts itself to operations of the type in which the zones of endothermic and exothermic reaction are periodically shifted and all of the desirable features of the process may be accomplished in an apparatus of relatively simple form.

It will be understood, of course, that the accompanying drawing illustrates only one of the many specific forms of apparatus in which the improved process provided by the invention may be conducted and should, therefore, not be construed as a limitation. For example, instead of comprising tubes, the zone in which the endothermic and exothermic reactions occur may be formed between spaced metallic sheets or plates of any desired contour and any other well known means of spraying or otherwise distributing the heat transfer liquid over the surface upon which it is vaporized by heat evolved in the exothermic reaction may be employed within the scope of the invention in place of the specific means illustrated in the drawing. Also, either up-flow or down-flow may be employed within the zones wherein the endothermic and exothermic reactions occur and the direction of flow is not necessarily the same in both zones. For example, an endothermic reaction such as dehydrogenation, catalytic cracking or the like may be accomplished by passing a stream of heated hydrocarbons upwardly through the zone of endothermic reaction in contact with a bed of catalytic material disposed therein, countercurrent to the direction of flow of the film or sheet of condensed heat transfer fluid flowing downward over the outer surface of the walls of this zone, while the catalytic material in the zone of exothermic reaction is being reactivated by passing a stream of hot oxygen-containing gases downwardly through this zone in contact with the catalyst, concurrent to the film or sheet of vaporizing heat transfer fluid flowing downwardly over the exterior surface of the walls of this zone, or, when desired, this procedure may be exactly reversed or concurrent or countercurrent flow, with respect to the films or sheets of heat transfer fluid flowing downwardly over the surface of the walls of the exothermic and endothermic reaction zones may be employed in both zones. As applied to the apparatus illustrated in the drawing, this means that nozzles 11 and 11' may be employed as inlet rather than outlet connections, while nozzles 9 and 9' are employed as outlet rather than inlet connections or their use as inlet and outlet connections may be alternated.

As an example of one specific operation of the process provided by the invention as applied to the catalytic cracking of hydrocarbon oil (the endothermic reaction) with periodic reactivation of the catalyst (the exothermic reaction), as it may be conducted in an apparatus of the character illustrated, we will assume that the catalyst employed comprises preformed granules or relatively small pellets of substantially uniform size and shape consisting essentially of alumina, silica and zirconia in the proportion of approximately 100 mols of $SiO_2$ to 2 mols of $Al_2O_3$ to 5 mols of $ZrO_2$. We will also assume that the oil to be cracked is substantially completely vaporized and heated to a temperature of approximately 950° F. prior to its contact with the active cracking catalyst and that, in addition to the heat thus supplied to the oil, an additional 250 B. t. u.'s per pound is required to effect the desired cracking reaction in contact with the catalyst. We will further assume that approximately 2% by weight of the oil is converted to heavy carbonaceous material which is deposited on the catalyst and that approximately 290 B. t. u.'s per pound of oil cracked are evolved during reactivation of the catalyst, reactivation being accomplished by passing a stream of heated oxygen-containing gases in contact with the catalyst bed upon which said carbonaceous material has been deposited during the preceding cracking phase of the operating cycle. Thus, the heat generated in the exothermic step exceeds the heat required in the endothermic step by 40 B. t. u.'s per pound of oil cracked.

In this particular instance, mercury is utilized as the convective medium for controlling the temperature of the reactions. It is desired to conduct the cracking reaction at a temperature of approximately 950° F. and reactivation of the catalyst is so conducted that the average temperature in the catalyst bed during reactivation is approximately 1050° F. The mercury is supplied to the zone of the reactor from which it is sprayed over the surface of the tubular elements in which the exothermic reaction is taking place at a temperature of approximately 980° F. and a superatmospheric pressure of approximately 250 pounds per square inch is employed in the mercury vaporizing and condensing space of the reactor. At this pressure, the mercury vaporizes at a temperature of approximately 1000° F. The circulating pump is operated at such a rate that approximately 227 pounds per hour of mercury are circulated through the system per 100 pounds of oil cracked per hour. This figure is derived by dividing the heat evolved during regeneration, per 100 pounds of oil cracked, by the heat of vaporization of mercury which is approximately 127.5 B. t. u.'s per pound (i. e., 29,000 divided by 127.5 equals 227+). However, when we divide the B. t. u.'s required to crack 100 pounds of oil by the heat of condensation of mercury, we find that only about 196 pounds per hour of mercury vapor need be condensed on the surface of the tubes in which the cracking reaction is taking place to satisfy the heat requirements (i. e., 25,000 divided by 127.5 equals 196+). Therefore, no liquid mercury is allowed to accumulate in the reactor and approximately 31 pounds per hour of mercury vapor is passed with the liquid mercury from the reactor through the condenser to the accumulator, the mixture of mercury vapor and liquid being cooled in the condenser to such a temperature that, allowing for radiation losses in the recirculating lines, the resulting liquid mercury is returned to the reactor at a temperature of about 980° F.

The figure above given for the pounds of mercury circulated through the system per 100 pounds of oil treated per hour is not to be taken as indicative of the quantity of mercury required within the system, since the rate of circulation preferably is relatively high so that the total mercury required within the system may be, for example, only $\frac{1}{10}$ to $\frac{1}{100}$ or less of the figure above given (i. e., approximately 2 to 20 pounds per 100 pounds of oil cracked per hour).

I claim as my invention:

1. The method of controlling the temperature of endothermic and exothermic reactions simultaneously conducted in separate reaction zones having heat-conductive walls, comprising the steps of contacting a heat transfer medium in the form of a flowing film or sheet of liquid at a temperature closely approaching its vaporization point with the heat-conductive walls of said exothermic reaction zone to substantially vaporize said fluid and absorb therein the latent heat of vaporization, causing resulting evolved vapors to contact the heat-conductive walls of the endothermic reaction zone and substantially condense thereon to liberate the latent heat of condensation, collecting liquid thus condensed from the vaporized heat transfer medium and returning the same in regulated quantities as said film or sheet of liquid into contact with said walls of the exothermic reaction zone.

2. The method defined in claim 1, wherein the heat content of said vapors is controllably increased prior to their contact with said walls of the endothermic reaction zone.

3. The method defined in claim 1, wherein the heat content of said vapors is controllably increased prior to their contact with said walls of the endothermic reaction zone by commingling a regulated additional quantity of hot vapors of said heat transfer medium therewith.

4. The method defined in claim 1, wherein a regulated quantity of said evolved vapors are prevented from contacting and condensing on said walls of the endothermic reaction zone.

5. The method defined in claim 1, wherein a regulated quantity of said evolved vapors are prevented from contacting and condensing on said walls of the endothermic reaction zone, said regulated quantity of vapors being separately condensed and the resulting condensate returned with the other liquid components of said heat transfer medium into contact with said walls of the exothermic reaction zone.

6. The method defined in claim 1, wherein the temperature of said heat transfer medium is readjusted ot the desired value prior to each successive contact thereof with said walls of the exothermic reaction zone.

7. An apparatus of the class described comprising an endothermic reaction zone and an exothermic reaction zone, both having heat-conductive walls, means for contacting the walls of said exothermic zone with a flowing film of a heat transfer liquid at a temperature closely approaching its vaporization point, means for contacting vapors of said liquid with the walls of said endothermic zone, means for collecting condensate condensed on the last-named walls, and means for returning regulated quantities of said condensate into contact with the walls of the exothermic zone.

8. The apparatus as defined in claim 7 further characterized in the provision of means for increasing the heat content of said vapors prior to their contact with the walls of the endothermic zone.

9. An apparatus of the class described comprising an endothermic reaction zone and an exothermic reaction zone, both having heat-conductive walls, means for contacting the walls of said exothermic zone with a flowing film of a heat transfer liquid at a temperature closely approaching its vaporization point, whereby vapors are evolved from said liquid, said endothermic and exothermic reaction zones being enclosed in a common vessel whereby vapors evolved from said liquid contact with and condense on the walls of the endothermic zone, an accumulator exterior of said vessel and means for supplying thereto condensate formed on the last-named walls, and means for returning liquid from the accumulator to said vessel and into contact with the walls of the exothermic zone.

CHARLES L. THOMAS.